United States Patent
Liu et al.

(10) Patent No.: US 10,969,885 B2
(45) Date of Patent: Apr. 6, 2021

(54) ARRAY SUBSTRATE, MANUFACTURING METHOD THEREFOR, AND TOUCH DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaona Liu, Beijing (CN); Yuqiong Chen, Beijing (CN); Mengjie Wang, Beijing (CN); Shuai Yuan, Beijing (CN); Chenchen Wu, Beijing (CN); Ning Li, Beijing (CN); Ziyi Zheng, Beijing (CN)

(73) Assignees: BEIJING BOE DISPLAY TECHNOLOGY CO., LTD. &, Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/485,821

(22) PCT Filed: Aug. 3, 2018

(86) PCT No.: PCT/CN2018/098420
§ 371 (c)(1),
(2) Date: Aug. 14, 2019

(87) PCT Pub. No.: WO2019/056869
PCT Pub. Date: Mar. 28, 2019

(65) Prior Publication Data
US 2020/0110479 A1    Apr. 9, 2020

(30) Foreign Application Priority Data
Sep. 25, 2017 (CN) .......................... 201710872250.8

(51) Int. Cl.
G06F 3/041 (2006.01)
G02F 1/1335 (2006.01)
G02F 1/1333 (2006.01)

(52) U.S. Cl.
CPC .......... *G06F 3/041* (2013.01); *G02F 1/13338* (2013.01); *G02F 1/133512* (2013.01); *G06F 2203/04103* (2013.01)

(58) Field of Classification Search
CPC ...... G06F 3/0412; G06F 3/044; G06F 3/0416; G06F 3/041; G06F 3/0418; G06F 3/0443;
(Continued)

(56) References Cited

U.S. PATENT DOCUMENTS 9,836,174 B2   12/2017   Zhou et al.
10,001,860 B2   6/2018   Li et al.
(Continued)

FOREIGN PATENT DOCUMENTS

CN   105117088 A   12/2015
CN   105388655     3/2016
(Continued)

OTHER PUBLICATIONS

Chinese Office Action dated Apr. 21, 2020 corresponding to Chinese Patent Application No. 201710872250.8; 23 pages.

*Primary Examiner* — Dong Hui Liang
(74) *Attorney, Agent, or Firm* — Leason Ellis LLP (57) ABSTRACT

An array substrate, a manufacturing method therefor, and a touch display panel are provided. The array substrate includes: a touch electrode, located on a base substrate and extending along a first direction; a pixel electrode, located on the base substrate, insulated from the touch electrode and including opposing outer edges, the outer edges being sequentially arranged along a second direction. In the second direction, the orthographic projection of the touch
(Continued)

electrode on the base substrate is located between the orthographic projections of the outer edges of the pixel electrode on the base substrate. The array substrate prevents or reduces differences between coupling capacitances between the pixel electrode and signal lines on two sides thereof.

19 Claims, 8 Drawing Sheets

(58) Field of Classification Search
CPC ............... G06F 3/04164; G06F 3/0446; G06F 2203/04103; G06F 2203/04111; G06F 2203/04107; G02F 1/13338; G02F 1/133512; G02F 1/134309; G02F 2201/123; G09G 2300/0426; G09G 2300/0478; G09G 3/3648; G09G 3/36; G09G 2320/0233

See application file for complete search history.

(56) References Cited

U.S. PATENT DOCUMENTS

| | | | |
|---|---|---|---|
| 10,289,244 B2 | 5/2019 | Cao | |
| 10,423,255 B2 | 9/2019 | Chen | |
| 2006/0001814 A1* | 1/2006 | Paik | G02F 1/136209 349/141 |
| 2010/0315377 A1 | 12/2010 | Chang et al. | |
| 2014/0022210 A1* | 1/2014 | Wu | G02F 1/13338 345/174 |
| 2015/0208521 A1* | 7/2015 | Seo | B32B 38/0008 361/746 |
| 2016/0357048 A1* | 12/2016 | Zhou | G02F 1/136227 |
| 2016/0370676 A1 | 12/2016 | Ono | |
| 2016/0370937 A1 | 12/2016 | Abe et al. | |
| 2017/0090662 A1* | 3/2017 | Yang | G06F 3/045 |
| 2017/0177159 A1* | 6/2017 | Cao | G06F 3/0418 |
| 2017/0220148 A1* | 8/2017 | Zhou | G02F 1/13338 |
| 2018/0335878 A1* | 11/2018 | Chen | G06F 3/0412 |

FOREIGN PATENT DOCUMENTS

| | | |
|---|---|---|
| CN | 106353905 | 3/2016 |
| CN | 105511688 A | 4/2016 |
| CN | 106597729 | 4/2017 |
| CN | 107085483 A | 8/2017 |

* cited by examiner

FIG. 6B forming signal lines, the touch electrode and adjacent signal lines on the base substrate by a same film, in which all the signal lines extend along the first direction —S61 forming a first transparent electrode on a surface of the base substrate, in which both the signal lines and the touch electrode are between the base substrate and the first transparent electrode in a direction perpendicular to the surface of the base substrate —S62 forming a second transparent electrode on the surface of the base substrate, in which the first transparent electrode is between the base substrate and the second transparent electrode in a direction perpendicular to the surface of the base substrate —S63

FIG. 7 forming a first connection portion of the touch electrode, a second connection portion of the touch electrode and adjacent signal lines on the surface of the base substrate by a same film, in which all the signal lines extend along the first direction —S71 forming a first transparent electrode and a transparent portion of the touch electrode on the surface of the base substrate by a same film, in which the transparent portion is electrically connected with the first connection portion and the second connection portion —S72 forming a second transparent electrode on the surface of the base substrate, in which the first transparent electrode is between the base substrate and the second transparent electrode in the direction perpendicular to the surface of the base substrate —S73

ARRAY SUBSTRATE, MANUFACTURING METHOD THEREFOR, AND TOUCH DISPLAY PANEL

CROSS-REFERENCE TO RELATED PATENT APPLICATIONS

This application is a U.S. National Stage Application under 35 U.S.C. § 371 of International Patent Application No. PCT/CN2018/098420, filed Aug. 3, 2018, which claims the benefit of priority to Chinese patent application No. 201710872250.8 filed on Sep. 25, 2017, both of which are incorporated by reference in their entireties as part of the present application.

TECHNICAL FIELD

The embodiments of the present disclosure relate to an array substrate and a method for manufacturing the same, and a touch display panel.

BACKGROUND

Touch technology provides an efficient and convenient way of man-machine interaction. At present, touch technology has been widely used in mobile phones, tablet computers and other electronic devices. In-panel touch display (for example, a touch structure is arranged inside a display panel) technology has a large application space because it can save cost and production power.

Liquid crystal touch screen is a common touch screen at present and mainly includes a touch part for realizing a touch function and a display part for realizing a liquid crystal display function. The liquid crystal display panel includes an array substrate and an opposite substrate (for example, a color filter substrate) opposite to each other, and a liquid crystal layer disposed between the array substrate and the opposite substrate. In a liquid crystal display device, deflections of liquid crystal molecules are controlled by applying voltages to a common electrode and a pixel electrode, so that light is controlled. For example, the array substrate is provided with structures such as an array of switch elements, gate lines, data lines, the common electrode, the pixel electrode, and the like.

SUMMARY

At least one embodiment of the present disclosure provides an array substrate, and the array substrate includes: a base substrate, a touch electrode which is on the base substrate and extends along a first direction, and a pixel electrode which is on the base substrate, insulated from the touch electrode and includes outer edges opposite to each other. The outer edges are sequentially arranged along a second direction, and the second direction intersects the first direction; in the second direction, an orthographic projection of the touch electrode on the base substrate is between orthographic projections of the outer edges of the pixel electrode on the base substrate.

For example, the array substrate further includes signal lines adjacent to the pixel electrode; the signal lines extend along the first direction; the pixel electrode is between the signal lines in the second direction.

For example, the signal lines are data lines or the signal lines are gate lines.

For example, the pixel electrode includes a first portion and a second portion which are electrically connected with each other, an opening is between the first portion and the second portion, and the orthographic projection of the touch electrode on the base substrate overlaps an orthographic projection of the opening on the base substrate.

For example, the touch electrode is within the opening in the second direction.

For example, the first portion of the pixel electrode and the second portion of the pixel electrode are directly electrically connected with each other.

For example, the first portion of the pixel electrode and the second portion of the pixel electrode are electrically connected with each other by a bridge wire, and the bridge wire and the pixel electrode are in different layers; or the first portion of the pixel electrode and the second portion of the pixel electrode are electrically connected with each other by a same switch element.

For example, the array substrate further includes a common electrode on the base substrate, and the common electrode and the pixel electrode are in different layers.

For example, one of the pixel electrode and the common electrode is closer to the base substrate than the other of the pixel electrode and the common electrode and is a first transparent electrode, the first transparent electrode includes a first sub-electrode and a second sub-electrode which are electrically connected with each other, and a strip-shaped opening extending along the first direction is between the first sub-electrode and the second sub-electrode; the orthographic projection of the touch electrode on the base substrate overlaps an orthographic projection of the strip-shaped opening on the base substrate.

For example, the touch electrode is between the first sub-electrode and the second sub-electrode in the second direction.

For example, the touch electrode is between the base substrate and the first transparent electrode in a direction perpendicular to the base substrate.

For example, the first transparent electrode and at least a portion of the touch electrode are in a same layer and are made of a same material.

For example, the touch electrode includes a first connection portion, a transparent portion and a second connection portion which are sequentially arranged along the first direction and are sequentially connected; the transparent portion and the first transparent electrode are in the same layer and are made of the same material, and the transparent portion and each of the first connection portion and the second connection portion are in different layers.

At least one embodiment of the present disclosure further provides a method for manufacturing an array substrate, and the method includes: forming a touch electrode extending along a first direction on a base substrate; and forming a pixel electrode on the base substrate. The pixel electrode is insulated from the touch electrode and includes outer edges opposite to each other, the outer edges are sequentially arranged along a second direction, and the second direction intersects the first direction. In the second direction, an orthographic projection of the touch electrode on the base substrate is between orthographic projections of the outer edges of the pixel electrode on the base substrate.

For example, the touch electrode and adjacent signal lines are formed on the base substrate and formed from a same film, and the signal lines extend along the first direction; a first transparent electrode is formed on the base substrate, so that both the signal lines and the touch electrode are between the base substrate and the first transparent electrode in a direction perpendicular to the base substrate; and a second transparent electrode is formed on the base substrate, so that the first transparent electrode is between the base substrate and the second transparent electrode in the direction perpendicular to the base substrate; one of the first transparent electrode and the second transparent electrode is the pixel electrode; the pixel electrode is between the signal lines in the second direction.

For example, a first connection portion of the touch electrode, a second connection portion of the touch electrode and adjacent signal lines are formed on the base substrate and formed from a same film, and the signal lines extend along the first direction; a first transparent electrode and a transparent portion of the touch electrode are formed on the base substrate and formed from a same film, and the transparent portion is electrically connected with the first connection portion and the second connection portion; a second transparent electrode is formed on the base substrate, and the first transparent electrode is between the base substrate and the second transparent electrode in a direction perpendicular to the base substrate. One of the first transparent electrode and the second transparent electrode is the pixel electrode; the pixel electrode is between the signal lines in the second direction.

For example, a first transparent electrode and the touch electrode are formed on the base substrate and formed from a same film; a second transparent electrode is formed on the base substrate, and the first transparent electrode is between the base substrate and the second transparent electrode in a direction perpendicular to the base substrate. One of the first transparent electrode and the second transparent electrode is the pixel electrode; the pixel electrode is between the signal lines in the second direction.

At least one embodiment of the present disclosure further provides a touch display panel which includes the array substrate according to any one of the above embodiments.

For example, the touch display panel further includes a black matrix, and the orthographic projection of the touch electrode on the base substrate is outside an orthographic projection of the black matrix on the base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Figure 1A:
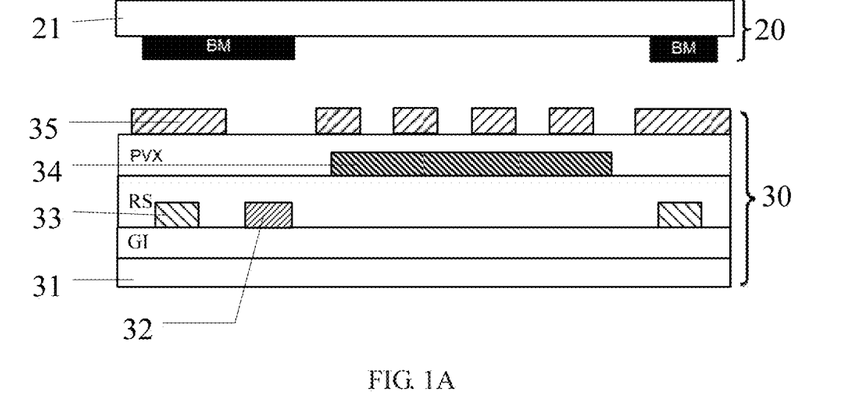
FIG. 1A is a cross-sectional view of a touch display panel.
Figure 1B:
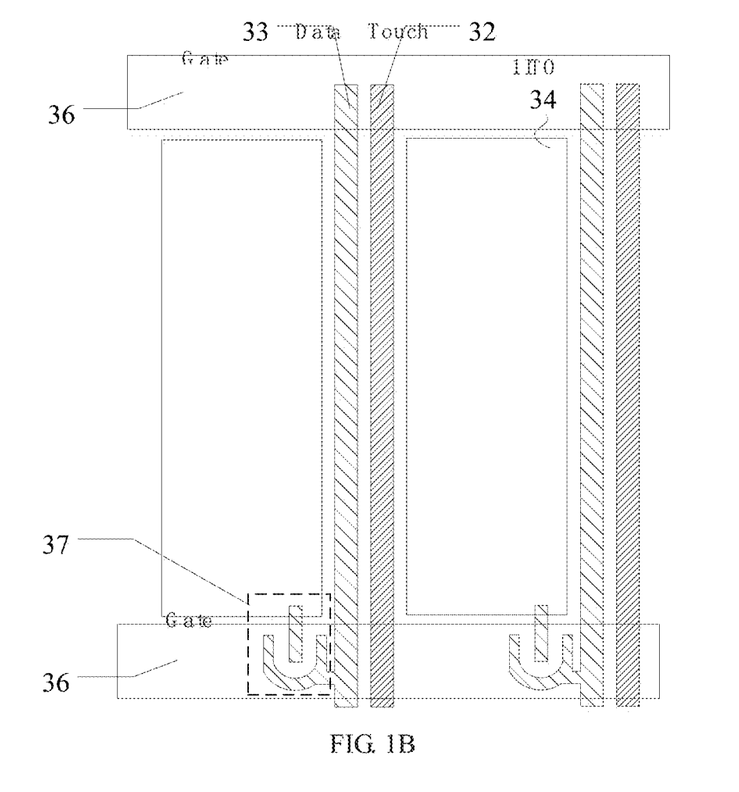
FIG. 1B is a schematic plane view of partial structures illustrated in FIG. 1A.

FIG. 1A is a schematic cross-sectional view of a touch display panel, and the touch display panel can be used to achieve a display function and a touch function; FIG. 1B is a schematic plane view of partial structures of the touch display device illustrated in FIG. 1A. As illustrated in FIG. 1A, the touch display panel includes an array substrate 30 and an opposite substrate 20, the opposite substrate 20 includes a base substrate 21 and a black matrix BM at a side, which faces the array substrate 30, of the base substrate 21; the array substrate 30 includes a base substrate 31 and includes a gate insulation layer GI, data lines 33, a touch electrode 32, a resin layer RS covering the data lines 33 and the touch electrode 32, pixel electrodes 34 on the resin layer RS, a passivation layer PVX covering the pixel electrodes 34, and a common electrode 35 on the passivation layer PVX, which are at a side, facing the opposite substrate 20, of array substrate 30. As illustrated in FIG. 1B, the array substrate further includes gate lines 36 and switch elements 37, the pixel electrode 34 is located in a region defined by adjacent gate lines 36 and adjacent data lines 33 and is electrically connected with the switch element 37, and thus the switch element 37 controls whether a data signal applied to the data line 33 is transmitted to the pixel electrode 34 or not.

In the study, the inventors of the present application noticed that in the touch display panel illustrated in FIG. 1A and FIG. 1B, in order to prevent the touch electrode 32 made of a metal material from affecting a display effect, the touch electrode 32 is beside the data line 33, and the touch electrode 32 is shielded by the black matrix BM; however, the touch electrode 32 is provided between the data line 33 and a side of the pixel electrode 34 (for example, the pixel electrode at a right side in FIG. 1B), and no touch electrode 32 is provided between another data line 33 and another side, which is opposite to the above-mentioned side, of the pixel electrode 34, so distances between the same pixel electrode 34 and the data lines 33 respectively at the two opposite sides of the pixel electrode 34 are greatly different, which results in a large difference between coupling capacitances Cpd between the pixel electrode 34 and the data lines 33 respectively at the two sides of the pixel electrode 34, and thus a defect of poor image display is produced.

The embodiments of the disclosure provide an array substrate, a method for manufacturing the same and a touch display panel. In at least one embodiment of the present disclosure, a touch electrode is between opposite outer edges of a pixel electrode and the touch electrode is not between the pixel electrode and a signal line (for example, a data line or a gate line) extending along an extension direction of the touch electrode, so as to prevent an introduction of the touch electrode from causing or increasing a difference in coupling capacitances between the pixel electrode and signal lines respectively at two sides of the pixel electrode.

Figure 2A:
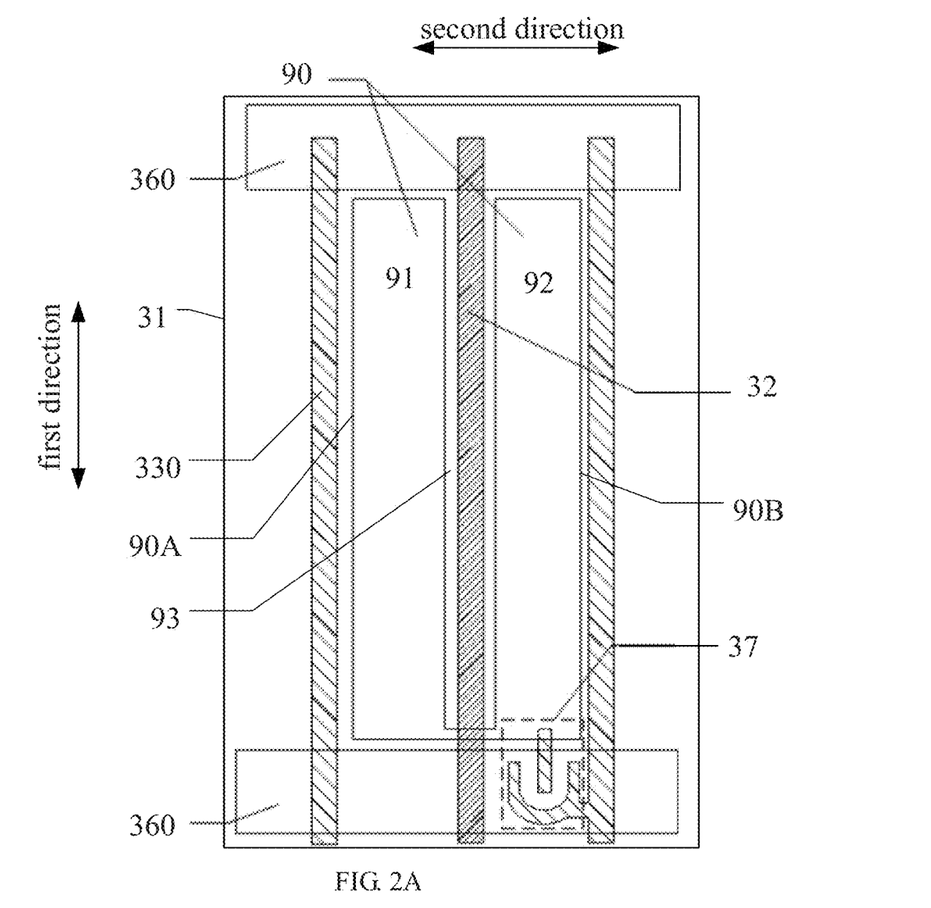
FIG. 2A is a first schematic plane view of the touch display panel provided by the embodiments of the present disclosure.
Figure 2B:
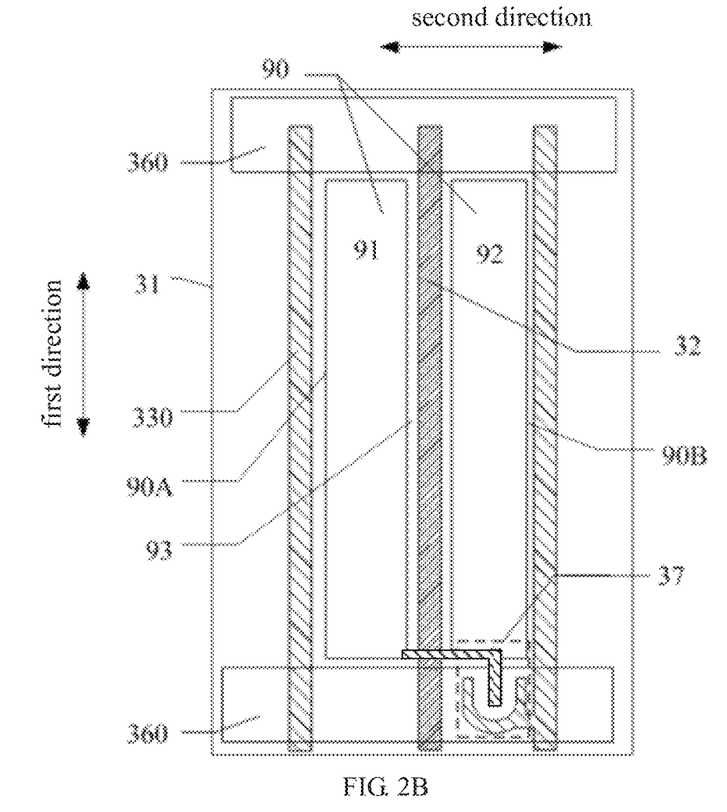
FIG. 2B is a second schematic plane view of the touch display panel provided by the embodiments of the present disclosure.

FIG. 2A and FIG. 2B are schematic plane views of the array substrate provided by the embodiments of the present disclosure. Referring to FIG. 2A and FIG. 2B, at least one embodiment of the present disclosure provides the array substrate, and the array substrate includes a base substrate 31 and includes a touch electrode 32 and a pixel electrode 90 which are on the base substrate 31. The touch electrode 32 extends along a first direction and has, for example, a linear structure extending along the first direction; or in other examples, in a case where the touch electrode extends along the first direction, for example, the touch electrode includes an extension portion extending along a direction different from the first direction in a non-display region to improve a touch detection accuracy without affecting an aperture ratio of a display panel. The pixel electrode 90 is insulated from the touch electrode 32 and includes a pair of outer edges 90A, 90B opposite to each other, for example, both the outer edges 90A, 90B extend substantially along the first direction and are sequentially arranged along a second direction, and the second direction intersects the first direction (for example, the second direction is perpendicular to the first direction); in the second direction, an orthographic projection of the touch electrode 32 on the base substrate 31 is between orthographic projections of the outer edges 90A, 90B of the pixel electrode 90 on the base substrate 31.

It should be noted that the outer edges 90A and 90B of the pixel electrode 90 are edges, which are included by the pixel electrode 90 and are farthest away from each other in the second direction.

The pixel electrode 90 and the touch electrode 32 may be respectively in different layers or in a same layer. That is, the pixel electrode 90 and the touch electrode 32 may be respectively formed from different films or formed from a same film. It should be noted that, structures being formed in the same layer refers to that the structures are formed from a same film.

For example, the pixel electrode 90 includes a first portion 91 and a second portion 92 which are electrically connected with each other, an opening 93 is between the first portion 91 and the second portion 92, and the opening is, for example, a strip-shaped opening extending along the first direction; the orthographic projection of the touch electrode 32 on the base substrate 31 overlaps an orthographic projection of the opening 93 on the base substrate 31. For example, the orthographic projection of the touch electrode 32 on the base substrate 31 is between an orthographic projection of the first portion 91 of the pixel electrode 90 on the base substrate 31 and an orthographic projection of the second portion 92 of the pixel electrode 90 on the base substrate 31 (that is, the touch electrode 32 is within the opening 93 in the second direction). In at least one embodiment of the present disclosure, in a case where the pixel electrode 90 and the touch electrode 32 are respectively in the different layers, an overlapping area of the touch electrode 32 and the pixel electrode 90 can be reduced by providing the opening 93 to reduce a parasitic capacitance between the touch electrode 32 and the pixel electrode 90, and thus to reduce a power consumption. In a case where the pixel electrode 90 and the touch electrode 32 are in the same layer, the opening 93 is used to accommodate the pixel electrode 90.

The first portion 91 of the pixel electrode 90 and the second portion 92 of the pixel electrode 90 are electrically connected with each other, which means that a same electrical signal (data signal) is applied to the first portion 91 and the second portion 92 during operation by a same switch element 37, for example, so that the first portion 91 and the second portion 92 are used for a display operation of a same subpixel (for example, red subpixel, green subpixel or blue subpixel), that is, the first portion 91 and the second portion 92 belong to the same subpixel but not different subpixels. In one example, the first portion 91 of the pixel electrode 90 is directly connected with the second portion 92 of the pixel electrode 90 to achieve the electrical connection between the first portion 91 and the second portion 92; for example, as illustrated in FIG. 2A, an end of the first portion 91 and an end of the second portion 92 are directly connected together. In one example, the first portion 91 of the pixel electrode 90 and the second portion 92 of the pixel electrode 90 are connected with each other by a bridge wire (for example, a bridge wire 344 as illustrated in FIG. 3B) to achieve the electrical connection between the first portion 91 and the second portion 92, and the bridge wire and the pixel electrode 90 are in different layers. For example, the bridge wire is a metal bridge wire to reduce a resistance of the bridge wire. In one example, as illustrated in FIG. 2B, the first portion 91 of the pixel electrode 90 and the second portion 92 of the pixel electrode 90 are electrically connected with a same switch element 37 to achieve the electrical connection between the first portion 91 and the second portion 92. For example, the array substrate further includes the switch element 37 (for example, a transistor), and the first portion 91 of the pixel electrode 90 and the second portion 92 of the pixel electrode 90 are both electrically connected with a same electrode (for example, a source electrode or a drain electrode) of the switch element 37, so that a same operation signal is applied to both the first portion 91 and the second portion 92 by the switch element 37.

For example, as illustrated in FIG. 2A and FIG. 2B, the array substrate provided by at least one embodiment of the present disclosure further includes signal lines 330 adjacent to the pixel electrode 90, and the signal lines 330 substantially extend along the first direction; the pixel electrode 90 is between the signal lines 330 in the second direction, thus the outer edges 90A, 90B of the pixel electrode 90 are also between the signal lines 330, and the outer edges 90A, 90B of the pixel electrode 90 are edges which are included by the pixel electrode 90 and are closest to the signal lines 330 respectively at two sides of the pixel electrode 90. Because the touch electrode 32 is not in a region between the pixel electrode 90 and each of the signal lines 330, a difference of coupling capacitances between the pixel electrode 90 and the signal lines 330 respectively at the two sides of the pixel electrode 90 is not generated or is not increased due to an introduction of the touch electrode 32; on the other hand, because the touch electrode 32 is not provided between the pixel electrode 90 and the signal line 330, in the second direction, a difference of distances between the pixel electrode 90 and the signal lines 330 is smaller than a width of the touch electrode 32, for example, the difference of the distances is approximately 0, that is, the distances between the pixel electrode 90 and the signal lines 330 are substantially equal.

A same type of electrical signal is applied to the signal lines 330 during operation. For example, gate scan signals are input to the signal lines 330 or data signals are input to the signal lines 330 during operation, that is, the signal lines 330 are gate lines or the signal lines 330 are data lines.

For example, the touch electrode 32 and the signal lines 330 are in a same layer. Therefore, the touch electrode 32 and the signal lines 330 are formed by patterning a same film to reduce a manufacturing process and a cost.

For example, as illustrated in FIG. 2A and FIG. 2B, the array substrate provided by at least one embodiment of the present disclosure further includes another type of adjacent signal lines 360 extending substantially along the second direction and are sequentially arranged along the first direction, and the signal lines 360 and the signal lines 330 are applied with different types of electrical signals during operation. For example, in FIG. 2A and FIG. 2B, a case where the signal lines 360 are gate lines and the signal lines 330 are data lines is taken as an example; in other embodiments, the signal lines 360 are data lines and the signal lines 330 are gate lines, and in this case, a positional relationship between the signal lines 360 and the switch element 37 and a positional relationship between the signal lines 330 and the switch element 37 in FIG. 2A and FIG. 2B also change accordingly. In the embodiments illustrated in FIG. 2A and FIG. 2B, the signal lines 360 are gate lines and the signal lines 330 are data lines, and the adjacent gate lines 360 and the adjacent data lines 330 intersect each other to define one subpixel, that is, one pixel unit; the touch electrode 32 and the data lines have a same extending direction and the touch electrode 32 is not arranged between the pixel electrode 90 and the data lines, so that the introduction of the touch electrode 32 is prevented from increasing the difference between the coupling capacitances Cpd between the pixel electrode 90 and the data lines respectively at two sides of the pixel electrode 90.

Figure 3A:
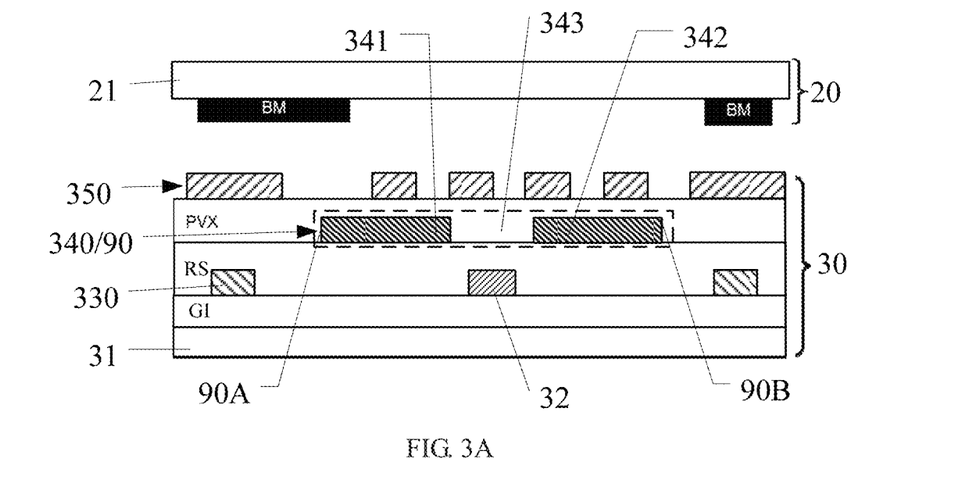
FIG. 3A is a first schematic cross-sectional view of the touch display panel provided by the embodiments of the present disclosure.
Figure 3B:
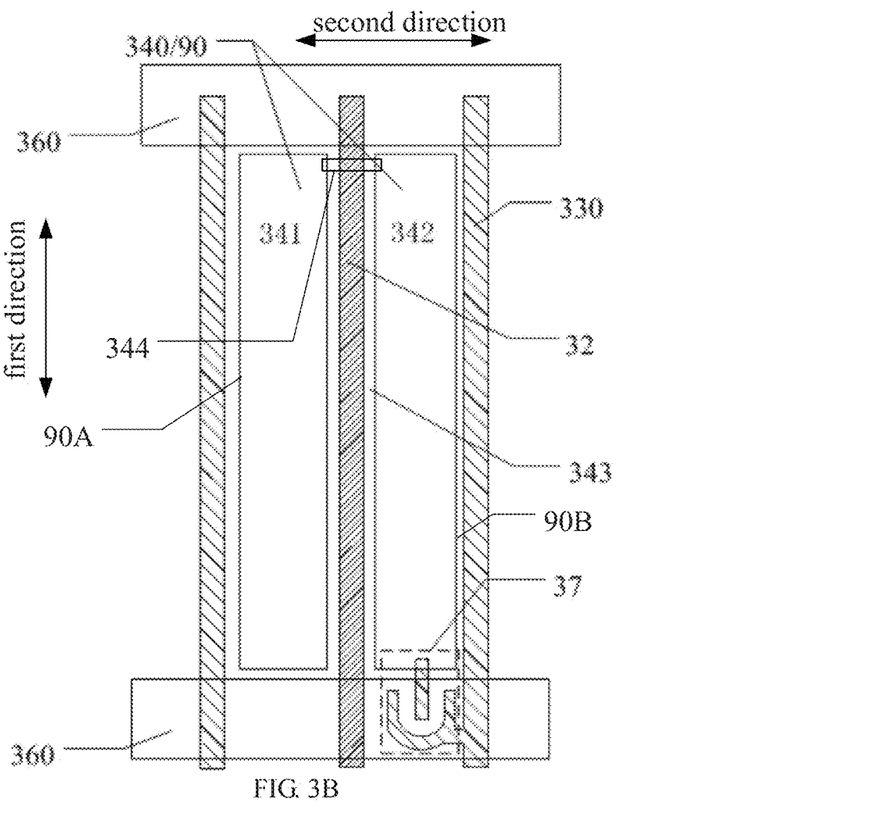
FIG. 3B is a schematic plane view of partial structures illustrated in FIG. 3A.
Figure 4A:
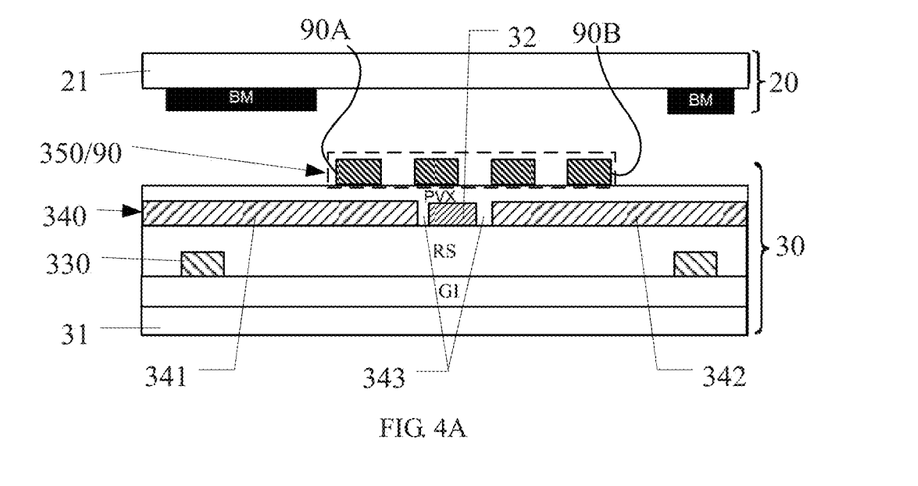
FIG. 4A is a second schematic cross-sectional view of the touch display panel provided by the embodiments of the present disclosure.
Figure 5:
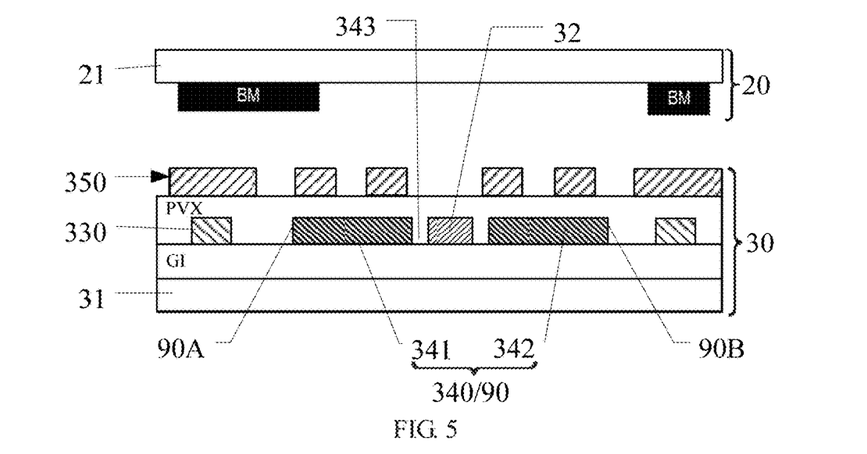
FIG. 5 is a third schematic cross-sectional view of the touch display panel provided by the embodiments of the present disclosure.

For example, as illustrated in FIG. 3A, FIG. 4A and FIG. 5, at least one embodiment of the present disclosure provides a touch display panel, which includes a black matrix BM in addition to the array substrates provided by any one of the above embodiments, and the orthographic projection of the touch electrode 32 on the base substrate 31 is outside an orthographic projection of the black matrix BM on the base substrate 31. That is, the touch electrode 32 is in a display region (a region not shielded by the black matrix BM) of the touch display panel instead of a non-display region shielded by the black matrix BM.

In order to avoid affecting display, the signal lines 330 are shielded by the black matrix BM, that is, orthographic projections of the signal lines 330 on the base substrate 31 is within the orthographic projection of the black matrix BM on the base substrate 31.

For example, as illustrated in FIG. 3A, FIG. 4A and FIG. 5, the touch display panel provided by at least one embodiment of the present disclosure includes the array substrate 30 and an opposite substrate 20, and a liquid crystal layer (not shown in the figures) is provided between the array substrate 30 and the opposite substrate 20, for example. The opposite substrate is, for example, a color filter substrate. The black matrix BM is in the opposite substrate 20; for example, the black matrix BM is at the side, which faces the array substrate 30, of the base substrate 21, referring to FIG. 3A, FIG. 4A and FIG. 5; alternatively, the black matrix BM is in the array substrate 30.

For example, the touch display panel provided by at least one embodiment of the present disclosure adopts an FFS (Fringe Field Switching) mode, and in this case, the array substrate 30 of the touch display panel includes the pixel electrode and the common electrode respectively disposed in different layers.

For example, the touch electrode 32 is electrically connected with a touch detection chip during a touch operation so that a touch driving signal is applied to the touch electrode 32, and the touch detection chip can determine a touch position according to signal acquired from the touch electrode 32. For example, in an example where the display operation and the touch operation are performed by the display panel in a time division manner, the touch electrode 32 is suspended during the display operation time or a common voltage is applied to the touch electrode 32 (for example, the touch electrode 32 is grounded or is applied with a low voltage).

For example, as illustrated in FIG. 3A, FIG. 4A and FIG. 5, the array substrate 30 of the touch display panel includes a first transparent electrode 340 and a second transparent electrode 350 which are on the base substrate 31 and a passivation insulation layer PVX between the first transparent electrode 340 and the second transparent electrode 350. In a direction perpendicular to the base substrate 31, the first transparent electrode 340 is between the base substrate 31 and the second transparent electrode 350, and one of the first transparent electrode 340 and the second transparent electrode 350 is the pixel electrode (referring to the first transparent electrode 340 in FIG. 3A and FIG. 5 and the second transparent electrode 350 in FIG. 4A) and the other of the first transparent electrode 340 and the second transparent electrode 350 is the common electrode (referring to the second transparent electrode 350 in FIG. 3A and FIG. 5 and the first transparent electrode 340 in FIG. 4A), that is, one of the pixel electrode and the common electrode is closer to the base substrate than the other of the pixel electrode and the common electrode and is the first transparent electrode; the orthographic projection of the pixel electrode on the base substrate 31 does not overlap the orthographic projections of the signal lines 330 on the base substrate 31, and an orthographic projection of the common electrode on the base substrate 31 overlaps or does not overlap the orthographic projections of the signal lines 330 on the base substrate 31. The second transparent electrode 350 has a structure of slits, thus after an electrical signal is applied to the second transparent electrode 350, because the second transparent electrode 350 is on an upper side of the first transparent electrode 340, an FFS electric field is formed between the second transparent electrode 350 and the first transparent electrode 340. For example, as illustrated in FIG. 3A, FIG. 4A and FIG. 5, the second transparent electrode 350 includes a plurality of sub-electrodes respectively separated by the slits.

In a case where the touch display panel adopts the FFS mode, for example, the first transparent electrode 340 and at least a portion of the touch electrode 32 are arranged in a same layer and are made of a same material (that is, the first transparent electrode 340 and at least a portion of the touch electrode 32 are formed by a same film), which enables the touch display panel to have a large aperture ratio and a large transmittance ratio and reduces the manufacturing process; alternatively, the touch electrode 32 is arranged in a layer different from the layer where each of the first transparent electrode 340 and the second transparent electrode 350 is located, and in this case, for example, the touch electrode 32 is made of a metal to obtain a small resistance.

For example, as illustrated in FIG. 3A, the touch electrode 32 is between the base substrate 31 and the first transparent electrode 340 (for example, the pixel electrode 90) in the direction perpendicular to the substrate 31. By arranging the touch electrode 32 below the first transparent electrode 340, it is convenient to manufacture the touch electrode 32 by using a metal layer which is included in the array substrate 30 and is below the first transparent electrode 340. In a case where a material of the touch electrode 32 is a metal, the touch electrode 32 may be made relatively small or play a role of the black matrix without affecting the display effect; in addition, because the black matrix BM does not need to shield the touch electrodes 32, a width of the black matrix BM may be made smaller than that of the touch display panel illustrated in FIG. 1A, and therefore the aperture ratio of the touch display panel illustrated in FIG. 3A is not reduced as a whole.

For example, the touch electrode 32 is made by the metal layer in which the signal lines 330 are located, that is, as illustrated in FIG. 3A, the touch electrode 32 and the signal lines 330 are in the same layer and made of the same material.

For example, in the embodiment illustrated in FIG. 3A, the signal lines 330 are the data lines. In this case, for example, a gate insulation layer GI covering the gate lines (not shown in the figure) is provided on the base substrate 31; the signal lines 330 and the touch electrode 32 are in the same layer (a data metal layer) and both are on the gate insulation layer GI; an insulation layer, such as a resin layer RS, covering the signal lines 330 and the touch electrode 32 is provided on the base substrate 31; and the first transparent electrode 340, the passivation insulation layer PVX and the second transparent electrode 350 are sequentially provided on the resin layer RS. In other examples, the signal lines 330 are the gate lines, then both the touch electrode 32 and the signal lines 330 are located in a gate metal layer.

For example, as illustrated in FIG. 3B, the first transparent electrode 340 includes a first sub-electrode 341 and a second sub-electrode 342 which are electrically connected with each other by the bridge wire 344 (as illustrated in FIG. 3B) or by the same switch element 37, or are directly electrically connected with each other, and a strip-shaped opening 343 extending along the first direction is between the first sub-electrode 341 and the second sub-electrode 342; in the second direction, the touch electrode 32 is between the first sub-electrode 341 and the second sub-electrode 342, that is, the orthographic projection of the touch electrode 32 on the base substrate 31 is between an orthographic projection of the first sub-electrode 341 on the base substrate 31 and an orthographic projection of the second sub-electrode 342 on the base substrate 31.

Because the touch electrode 32 is below the first transparent electrode 340, an overlapping area of the touch electrode 32 and the first transparent electrode 340 is reduced by providing the strip-shaped opening 343 to reduce the power consumption and avoid an interference between the touch electrode 32 and the first transparent electrode 340; on the other hand, because the touch position is at an upper side of the touch electrode 32 (a side away from the base substrate 31), providing the strip-shaped opening 343 also prevents the touch signal from being shielded by the first transparent electrode 340.

For example, in a case where the first transparent electrode 340 in FIG. 3A is the pixel electrode 90, the first sub-electrode 341, the second sub-electrode 342 and the strip-shaped opening 343 which are included in the first transparent electrode 340 are respectively the first portion 91 of the pixel electrode 90, the second portion 92 of the pixel electrode 90 and the opening 93 of the pixel electrode 90.

For example, as illustrated in FIG. 4A, the first transparent electrode 340 (for example, the common electrode) and a portion of the touch electrode 32 are in the same layer and are made of the same material. Because this portion of the touch electrode 32 is transparent, the transmittance ratio and the aperture ratio of the touch display panel are improved.

For example, in the embodiment illustrated in FIG. 4A, the signal lines 330 are the data lines. In this case, for example, the gate insulation layer GI covering the gate lines (not shown in the figure) is provided on the base substrate 31; the signal lines 330 are on the gate insulation layer GI; an insulation layer covering the signal lines 330 such as a resin layer RS is provided on the base substrate 31; the touch electrode 32 and the first transparent electrode 340 are provided on the resin layer RS; the passivation insulation layer PVX covers the touch electrode 32 and the first transparent electrode 340; and the second transparent electrode 350 is on the passivation insulation layer PVX. In other examples, the signal lines 330 are the gate lines, and both the touch electrode 32 and the signal lines 330 are located in the gate metal layer.

Figure 4B:
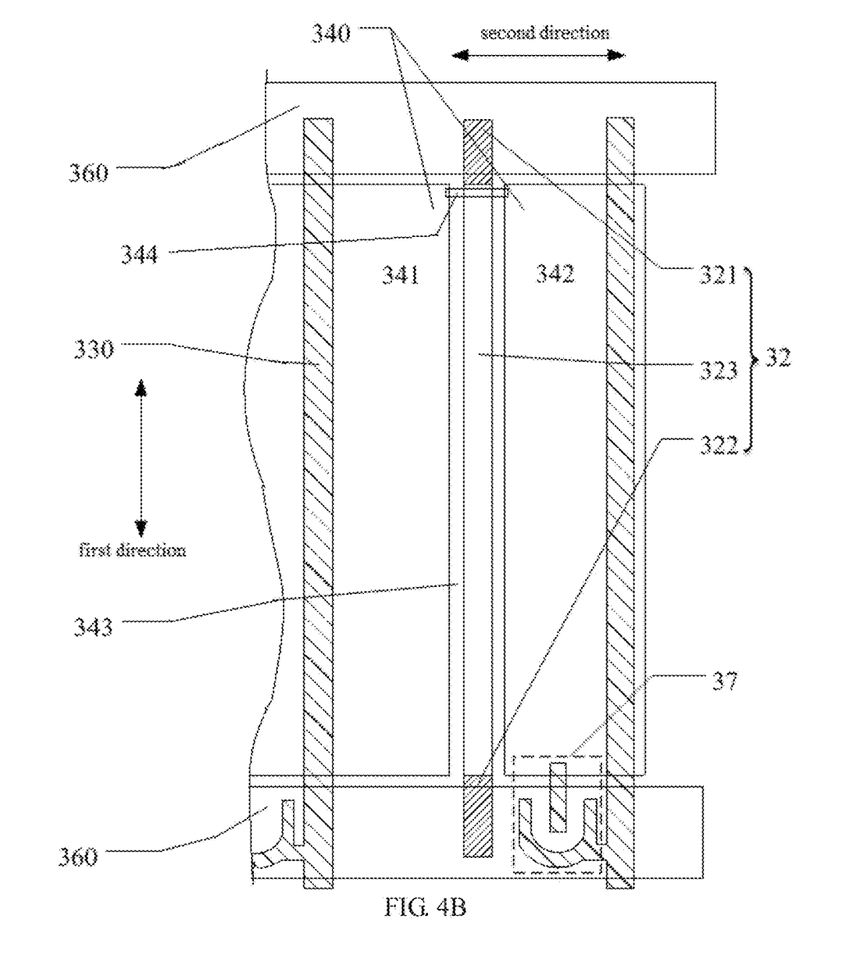
FIG. 4B is a schematic plane view of partial structures illustrated in FIG. 4A.

For example, as illustrated in FIG. 4B, the touch electrode 32 includes a first connection portion 321, a transparent portion 323 (for example, the transparent portion 323 is located between the signal lines 360 in the first direction) and a second connection portion 322 which are sequentially arranged along the first direction and are sequentially connected, the transparent portion 323 and the first transparent electrode 340 are in a same layer and are made of a same material, and each of the first connection portion 321 and the second connection portion 322 is in a layer different from the layer where the transparent portion 323 is located. For example, both a material of the first connection portion 321 and a material of the second connection portion 322 include a metal; for example, the first connection portion 321, the second connection portion 322 and the signal lines 330 are in a same layer and are made of a same material.

It should be noted that only the first transparent electrode 340 (for example, the first transparent electrode 340 covers a part of the switch element 37) serving as the common electrode is shown in FIG. 4B, and the second transparent electrode 350 serving as the pixel electrode electrically connected with the switch element 37 is not shown.

In at least one embodiment of the present disclosure, the touch electrode 32 has the transparent portion 323 disposed in the layer same as the layer where the first transparent electrode 340 is located, and the transparent portion 323 and the first transparent electrode 340 are formed by patterning a same film, so that the manufacturing process and the cost are reduced; in a case where the first transparent electrode 340 is the common electrode, the touch electrode 32 in the display region can also be reused as the common electrode during the display operation, and the FFS electric field is formed between the touch electrode 32 and the second transparent electrode 350, thus the transmittance ratio and a display quality of the touch display panel are improved, that is, the touch electrode 32 has dual functions of the common electrode and the touch electrode; the first connection portion 321 and the second connection portion 322 are made of the metal, which is beneficial to reducing a resistance of the touch electrode 32 and improving a conductivity of the touch electrode 32.

For example, each of the first connection portion 321 and the second connection portion 322 is electrically connected with the transparent portion 323 by a via hole. For example, the first connection portion 321 and the second connection portion 322 are shielded by the black matrix BM.

For example, as illustrated in FIG. 4A and FIG. 4B, the first transparent electrode 340 includes the first sub-electrode 341 and the second sub-electrode 342 which are electrically connected; for example, the first sub-electrode 341 and the second sub-electrode 342 are electrically connected with each other by the bridge wire 344 (as illustrated in FIG. 4B) or are electrically connected with each other by a common electrode line, and the strip-shaped opening 343 extending in the first direction is between the first sub-electrode 341 and the second sub-electrode 342; in the second direction, the touch electrode 32 is between the first sub-electrode 341 and the second sub-electrode 342. In at least one embodiment of the present disclosure, the strip-shaped opening 343 is used to accommodate the touch electrode 32 so that the touch electrode 32, the first sub-electrode 341 and the second sub-electrode 342 are disposed in a same layer.

For example, as illustrated in FIG. 5, the entire touch electrode 32 and the first transparent electrode 340 (for example, the pixel electrode 90) are in the same layer and are made of the same material. Because the entire touch electrode 32 is transparent, the transmittance ratio and the aperture ratio of the touch display panel are improved.

In at least one embodiment of the present disclosure, the entire touch electrode 32 and the first transparent electrode 340 are in the same layer, and therefore, for example, the entire touch electrode 32 and the first transparent electrode 340 are formed by patterning the same film to reduce the manufacturing process and the cost. In a case where the first transparent electrode 340 is the pixel electrode, the touch electrode 32 can also be reused as the common electrode during the display operation, and an IPS electric field is formed between the touch electrode 32 and the first transparent electrode 340, thus the transmittance ratio of the touch display panel is improved, that is, the touch electrode 32 has dual functions of the common electrode and the touch electrode.

For example, in the embodiment illustrated in FIG. 5, the signal lines 330 are the data lines. In this case, for example, the gate insulation layer GI covering the gate lines (not shown in the figure) is provided on the base substrate 31; the signal lines 330, the first transparent electrode 340 and the touch electrode 32 are on the gate insulation layer GI; a passivation insulation layer PVX covering the signal lines 330, the first transparent electrode 340 and the touch electrode 32 is further provided on the base substrate 31; and the second transparent electrode 350 is provided on the passivation insulation layer PVX. In other examples, the signal lines 330 are the gate lines, and both the touch electrode 32 and the signal lines 330 are located in the gate metal layer.

For example, a schematic plane view of the touch electrode 32, the signal line 330 and the first transparent electrode 340 in the touch display panel illustrated in FIG. 5 can be referred to FIG. 3B. Repetitions are not be repeated.

For example, in a case where the first transparent electrode 340 in FIG. 5 is the pixel electrode 90, the first sub-electrode 341, the second sub-electrode 342 and the strip-shaped opening 343 which are included in the first transparent electrode 340 are respectively the first portion 91 of the pixel electrode 90, the second portion 92 of the pixel electrode 90 and the opening 93 of the pixel electrode 90.

Figure 6A:
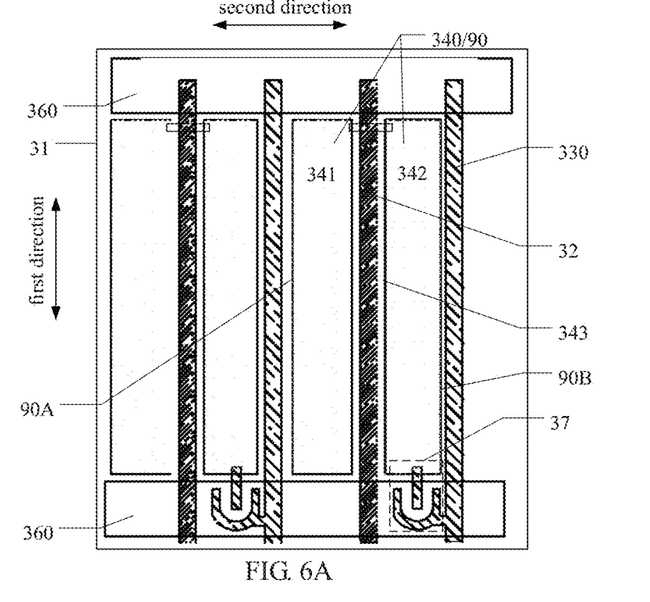
FIG. 6A is a first schematic plane view of an array substrate included by the touch display panel provided by the embodiments of the present disclosure.
Figure 6B:
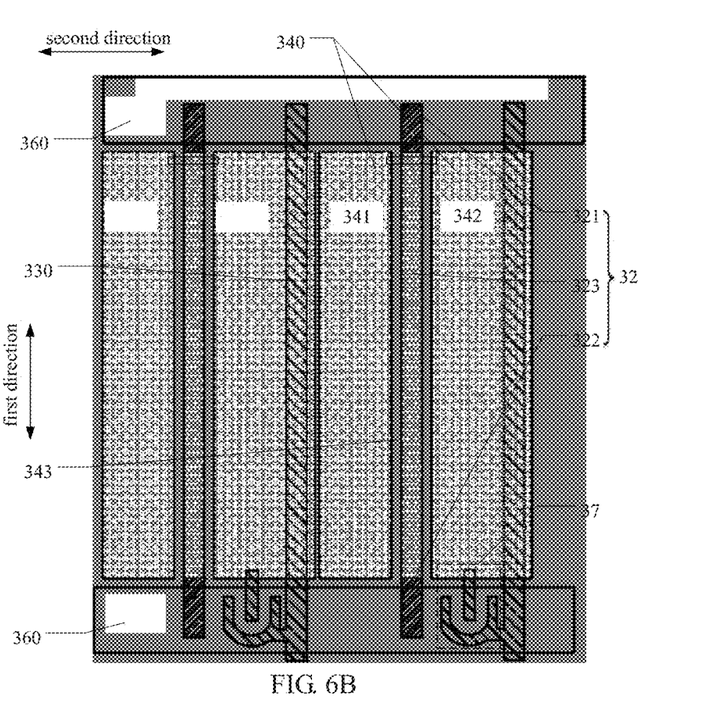
FIG. 6B is a second schematic plane view of the array substrate included by the touch display panel provided by the embodiments of the present disclosure.

For example, as illustrated in FIG. 6A and FIG. 6B, in the touch display panel, the array substrate includes adjacent pixel units (two pixel units are shown in the figure as an example), one signal line 330 is provided between the adjacent pixel units, and no touch electrode 32 is provided between the signal line 330 and the pixel electrode 90 of each of the adjacent pixel units.

For example, the touch display panel adopts the FFS mode, that is, the array substrate 30 in the touch display panel includes the first transparent electrode 340 and the second transparent electrode 350 (as illustrated in FIG. 3A, FIG. 4A and FIG. 5), one of the first transparent electrode 340 and the second transparent electrode 350 is the pixel electrode and the other is the common electrode. FIG. 6A takes a case where the first transparent electrode 340 serves as the pixel electrode as an example and FIG. 6B takes a case where the first transparent electrode 340 serves as the common electrode as an example.

For example, the touch display panel is an in-cell touch display panel, that is, the touch electrode is inside the touch display panel. For example, the display panel includes the array substrate 30 as illustrated in FIG. 3A, FIG. 4A and FIG. 5 and the opposite substrate 20, and the touch electrode 32 is between the base substrate 31 of the array substrate 30 and a base substrate 21 of the opposite substrate 20.

The touch display panel provided by at least one embodiment of the disclosure can be used for any product or component with touch and display functions such as a liquid crystal display device, an electronic paper, a mobile phone, a tablet computer, a television, a display, a notebook computer, a digital photo frame, a navigator and the like.

At least one embodiment of the present disclosure further provides the array substrate. Schematic plane views of the array substrate can be referred to FIG. 2A, FIG. 2B, FIG. 3B, FIG. 6A and FIG. 6B, and schematic cross-sectional views of the array substrate can be referred to the cross-sectional views of the array substrate 30 in FIG. 3A, FIG. 4A and FIG. 5. As illustrated in these figures, the array substrate provided by at least one embodiment of the present disclosure includes the base substrate 31, the touch electrode 32 and the pixel electrode 90 which are located on the base substrate 31. The touch electrode 32 extends along the first direction. The pixel electrode 90 is insulated from the touch electrode 32 and includes opposite outer edges 90A, 90B, which extend along the first direction and are sequentially arranged along the second direction; in the second direction (an arrangement direction of the outer edges 90A, 90B), the orthographic projection of the touch electrode 32 on the base substrate 31 is between the orthographic projections of the outer edges 90A, 90B on the base substrate 31.

Arrangements of each component in the array substrate of the embodiment of the present disclosure can be referred to the relevant description in the above-mentioned embodiment of the array substrate, and repetitions are not repeated.

At least one embodiment of the present disclosure also provides a method for manufacturing an array substrate, taking the array substrate illustrated in FIG. 2A and FIG. 2B as an example, the method includes: forming the touch electrode 32 extending in the first direction on the base substrate 31; forming the pixel electrode 90 on the base substrate 31, so that the pixel electrode 90 is insulated from the touch electrode 32 and includes outer edges 90A, 90B opposite to each other, the outer edges 90A, 90B substantially extend along the first direction and are sequentially arranged along the second direction (for example, the second direction intersects the first direction), and the orthographic projection of the touch electrode 32 on the base substrate 31 is between orthographic projections of the outer edges 90A, 90B of the pixel electrode 90 on the base substrate 31 in the second direction.

For example, the touch electrode 32 is formed by a metal layer and/or a transparent conductive layer of the array substrate, so that there is no need of additionally adding a mask plate for separately manufacturing the touch electrode 32 to reduce processes and the cost.

Figure 7:
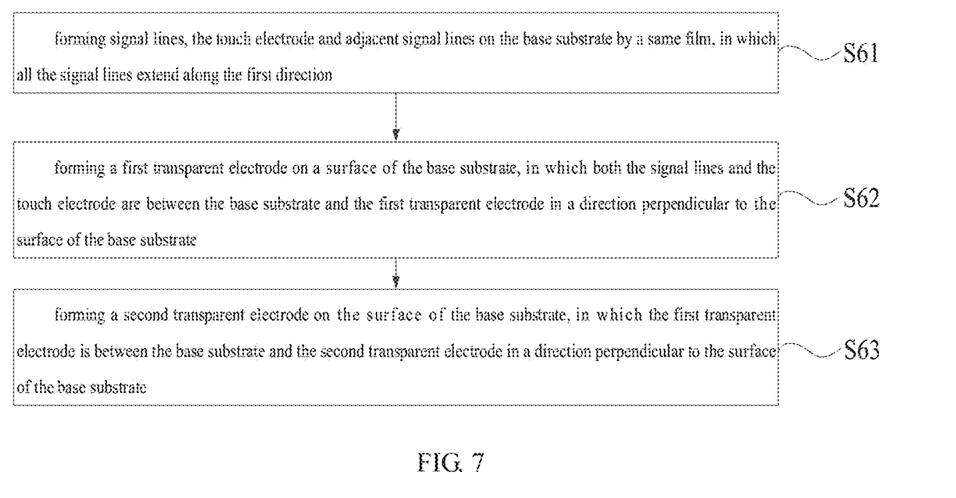
FIG. 7 is a first flow chart of a method for manufacturing the touch display panel provided by the embodiments of the present disclosure.

For example, referring to FIG. 3A, the entire touch electrode 32 and signal lines 330 included in the array substrate are formed by a same film. In this case, the method for manufacturing the array substrate includes, for example, step S61 to step S63 as illustrated in FIG. 7.

Step S61: forming the touch electrode 32 and adjacent signal lines 330 on the base substrate 31 by a same film, so that the signal lines 330 extend along the first direction and are sequentially arranged along the second direction, and the touch electrode 32 is between the signal lines 330.

Step S62: forming the first transparent electrode 340 on the base substrate 31, so that both the signal lines 330 and the touch electrode 32 are between the base substrate 31 and the first transparent electrode 340 in the direction perpendicular to the base substrate 31.

Step S63: forming the second transparent electrode 350 on the base substrate 31, so that the first transparent electrode 340 is between the base substrate 31 and the second transparent electrode 350 in the direction perpendicular to the base substrate 31.

In the above-mentioned steps, one of the first transparent electrode 340 and the second transparent electrode 350 is the pixel electrode, and the pixel electrode is between the signal lines 330 in the second direction.

Figure 8:
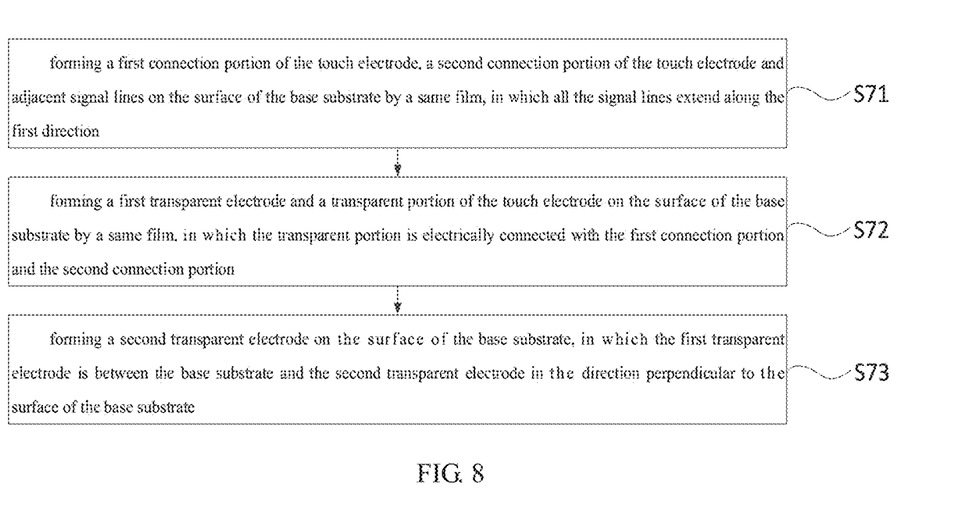
FIG. 8 is a second flow chart of the method for manufacturing the touch display panel provided by the embodiments of the present disclosure.

For example, referring to FIG. 4A and FIG. 4B, the touch electrode 32 includes a portion formed by a same film as the signal line 330 and another portion formed by another same film as the first transparent electrode 340; thus in this case, the method for manufacturing the array substrate includes, for example, step S71 to step S73 as illustrated in FIG. 8.

Step S71: forming the first connection portion 321 of the touch electrode 32, the second connection portion 322 of the touch electrode 32 and adjacent signal lines 330 on the base substrate 31 by a same film, so that the signal lines 330 extend along the first direction and are sequentially arranged along the second direction, and the first connection portion 321 and the second connection portion 322 are between the signal lines 330.

Step S72: forming the first transparent electrode 340 and the transparent portion 323 of the touch electrode 32 on the base substrate 31 by a same film, so that the transparent portion 323 is electrically connected with the first connection portion 321 and the second connection portion 322.

Step S73: forming the second transparent electrode 350 on the base substrate 31, so that the first transparent electrode 340 is between the base substrate 31 and the second transparent electrode 350 in the direction perpendicular to the base substrate 31.

In the above-mentioned steps, one of the first transparent electrode 340 and the second transparent electrode 350 is the pixel electrode; and the pixel electrode is between the signal lines 330 in the second direction.

Figure 9:
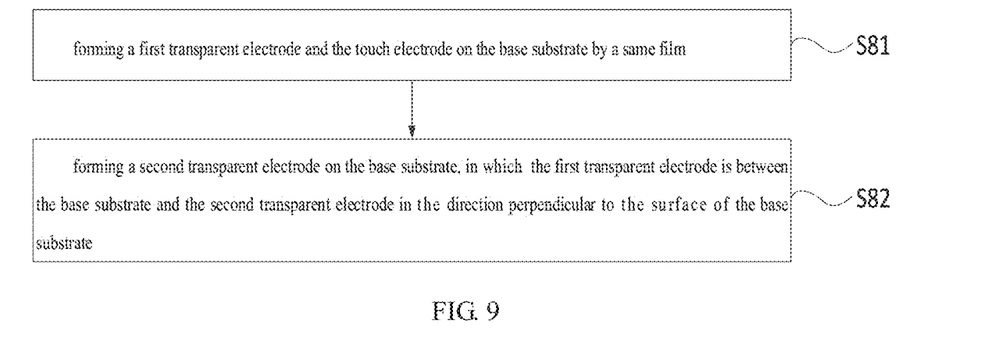
FIG. 9 is a third flow chart of the method for manufacturing the touch display panel provided by the embodiments of the present disclosure.

For example, referring to FIG. 5, the entire touch electrode 32 and the first transparent electrode 340 which are included in the array substrate are formed by a same film. In this case, the method for manufacturing the array substrate includes, for example, step S81 to step S82 as illustrated in FIG. 9.

Step S81: forming the first transparent electrode 340 and the touch electrode 32 on the base substrate 31 by a same film.

Step S82: forming the second transparent electrode 350 on the base substrate 31, so that the first transparent electrode 340 is between the base substrate 31 and the second transparent electrode 350 in the direction perpendicular to the base substrate 31, and one of the first transparent electrode 340 and the second transparent electrode 350 is the pixel electrode.

The above embodiments of the array substrate, the method for manufacturing the same and the touch display panel can be mutually referenced.

To sum up, the embodiments of the present disclosure avoid or reduce the difference in the coupling capacitances between the pixel electrode and the signal lines respectively at the two sides of the pixel electrode by optimizing the structure of the array substrate, thus to avoid a problem of image display and ensure the yield. On the other hand, some embodiments of the present disclosure can improve the aperture ratio and achieve an improvement of the transmittance ratio.

The following should be noted: (1) only the structures mentioned in the embodiments of the present disclosure are involved in the drawings of the embodiments of the present disclosure, and other structures can refer to usual designs; (2) the embodiments and features in different embodiments of the present disclosure can be combined in case of no conflict.

What have been described above are only specific implementations of the present disclosure, the protection scope of the present disclosure is not limited thereto. The protection scope of the present disclosure should be based on the protection scope of the claims.

What is claimed is:
1. An array substrate, comprising:
a base substrate;
a touch electrode on the base substrate, extending along a first direction; and
a pixel electrode on the base substrate, insulated from the touch electrode and comprising outer edges opposite to each other, wherein the outer edges are sequentially arranged along a second direction, and the second direction intersects the first direction;
wherein in the second direction, an orthographic projection of the touch electrode on the base substrate is between orthographic projections of the outer edges of the pixel electrode on the base substrate;

the pixel electrode comprises a first portion and a second portion which are electrically connected with each other, an opening is between the first portion and the second portion, and the orthographic projection of the touch electrode on the base substrate overlaps an orthographic projection of the opening on the base substrate;

the first portion and the second portion are connected with a same switch element and are configured to provide an electrical signal to a same subpixel.

2. The array substrate according to claim 1, further comprising a common electrode on the base substrate, wherein the common electrode and the pixel electrode are in different layers.

3. The array substrate according to claim 2, wherein one of the pixel electrode and the common electrode is closer to the base substrate than the other one of the pixel electrode and the common electrode and is a first transparent electrode, the first transparent electrode comprises a first sub-electrode and a second sub-electrode which are electrically connected with each other, and a strip-shaped opening extending along the first direction is between the first sub-electrode and the second sub-electrode;

the orthographic projection of the touch electrode on the base substrate overlaps an orthographic projection of the strip-shaped opening on the base substrate.

4. The array substrate according to claim 3, wherein the first transparent electrode and at least a portion of the touch electrode are in a same layer and comprise a same material.

5. The array substrate according to claim 4, wherein the touch electrode comprises a first connection portion, a transparent portion and a second connection portion which are sequentially arranged along the first direction and are sequentially connected;

the transparent portion and the first transparent electrode are in the same layer and comprise the same material, and the transparent portion and each of the first connection portion and the second connection portion are in different layers.

6. The array substrate according to claim 3, wherein the touch electrode is between the first sub-electrode and the second sub-electrode in the second direction.

7. The array substrate according to claim 3, wherein the touch electrode is between the base substrate and the first transparent electrode in a direction perpendicular to the base substrate.

8. The array substrate according to claim 1, further comprising signal lines adjacent to the pixel electrode, wherein the signal lines extend along the first direction;

the pixel electrode is between the signal lines in the second direction.

9. The array substrate according to claim 8, wherein the signal lines are data lines.

10. A touch display panel, comprising the array substrate according to claim 1.

11. The touch display panel according to claim 10, further comprises a black matrix, wherein the orthographic projection of the touch electrode on the base substrate is outside an orthographic projection of the black matrix on the base substrate.

12. The array substrate according to claim 1, wherein the first portion of the pixel electrode and the second portion of the pixel electrode are connected with each other through a connection structure.

13. The array substrate according to claim 12, wherein the connection structure is a bridge wire, and the bridge wire and the pixel electrode are in different layers; or the connection structure is the same switch element.

14. The array substrate according to claim 1, wherein the orthographic projection of the touch electrode is between orthographic projections, on the base substrate, of edges which are respectively comprised by the first portion and the second portion and are adjacent to the opening.

15. The array substrate according to claim 1, wherein the first portion of the pixel electrode and the second portion of the pixel electrode are directly electrically connected with each other.

16. A method for manufacturing an array substrate, comprising:

forming a touch electrode extending along a first direction on a base substrate; and forming a pixel electrode on the base substrate, wherein the pixel electrode is insulated from the touch electrode and comprises outer edges opposite to each other, the outer edges are sequentially arranged along a second direction, and the second direction intersects the first direction;

wherein in the second direction, an orthographic projection of the touch electrode on the base substrate is between orthographic projections of the outer edges of the pixel electrode on the base substrate;

the pixel electrode comprises a first portion and a second portion which are electrically connected with each other, an opening is between the first portion and the second portion, and the orthographic projection of the touch electrode on the base substrate overlaps an orthographic projection of the opening on the base substrate;

the first portion and the second portion are connected with a same switch element and are configured to provide an electrical signal to a same subpixel.

17. The method according to claim 16, wherein the touch electrode and adjacent signal lines are formed on the base substrate and formed from a same film, and the signal lines extend along the first direction;

a first transparent electrode is formed on the base substrate, and both the signal lines and the touch electrode are between the base substrate and the first transparent electrode in a direction perpendicular to the base substrate;

a second transparent electrode is formed on the base substrate, and the first transparent electrode is between the base substrate and the second transparent electrode in the direction perpendicular to the base substrate;

one of the first transparent electrode and the second transparent electrode is the pixel electrode, and the pixel electrode is between the signal lines in the second direction.

18. The method according to claim 16, wherein a first connection portion of the touch electrode, a second connection portion of the touch electrode and adjacent signal lines are formed on the base substrate and formed from a same film, and the signal lines extend along the first direction;

a transparent portion of the touch electrode and a first transparent electrode are formed on the base substrate and formed from another same film, and the transparent portion is electrically connected with the first connection portion and the second connection portion;

a second transparent electrode is formed on the base substrate, and the first transparent electrode is between the base substrate and the second transparent electrode in a direction perpendicular to the base substrate;

one of the first transparent electrode and the second transparent electrode is the pixel electrode, and the pixel electrode is between the signal lines in the second direction.

19. The method according to claim 16, wherein a first transparent electrode and the touch electrode are formed on the base substrate and formed from a same film;

a second transparent electrode is formed on the base substrate, and the first transparent electrode is between the base substrate and the second transparent electrode in a direction perpendicular to the base substrate;

one of the first transparent electrode and the second transparent electrode is the pixel electrode.

* * * * *

UNITED STATES PATENT AND TRADEMARK OFFICE
CERTIFICATE OF CORRECTION

PATENT NO. : 10,969,885 B2  
APPLICATION NO. : 16/485821  
DATED : April 6, 2021  
INVENTOR(S) : Xiaona Liu et al.

Page 1 of 1

It is certified that error appears in the above-identified patent and that said Letters Patent is hereby corrected as shown below:

On the Title Page

At item (73) Assignees, beginning at Line 1:
"BEIJING BOE DISPLAY TECHNOLOGY CO., LTD. &" should be --BEIJING BOE DISPLAY TECHNOLOGY CO., LTD.--

Signed and Sealed this  
Thirty-first Day of December, 2024

Derrick Brent  
*Acting Director of the United States Patent and Trademark Office*